United States Patent [19]

Swearingen

[11] 4,082,379
[45] Apr. 4, 1978

[54] BEARING ASSEMBLY

[76] Inventor: Judson S. Swearingen, 2235 Carmelina Ave., Los Angeles, Calif. 90064

[21] Appl. No.: 733,874

[22] Filed: Oct. 19, 1976

[51] Int. Cl.² .............................................. F16C 35/08
[52] U.S. Cl. ........................................ 308/26; 308/78; 308/79.1
[58] Field of Search ............................ 308/26, 53–57, 308/78, 79.1, 81, 93, 98, 103, 117, 175, 176, 245

[56] References Cited

U.S. PATENT DOCUMENTS

| 345,798 | 7/1886 | Meneely | 308/56 |
|---|---|---|---|
| 2,276,143 | 3/1942 | Bell | 308/56 UX |
| 2,711,934 | 6/1955 | Rickenmann | 308/9 |
| 3,899,222 | 8/1975 | Mendelevsky et al. | 308/5 |
| 3,934,948 | 1/1976 | Pruvot | 308/9 |

Primary Examiner—Duane A. Reger
Attorney, Agent, or Firm—Browning, Bushman & Zamecki

[57] ABSTRACT

An improved bearing assembly comprising a shaft and a journal bearing member having an annular journal portion receiving the shaft for relative rotation. The journal bearing member also includes an annular flange portion extending radially outwardly from the journal portion and having effective radial rigidity less than that of the journal portion. The assembly may also include a thrust bearing member on the shaft opposed to the flange portion of the journal bearing member and an improved system of lubricant passageways for delivering lubricant to the bearing surfaces.

25 Claims, 8 Drawing Figures

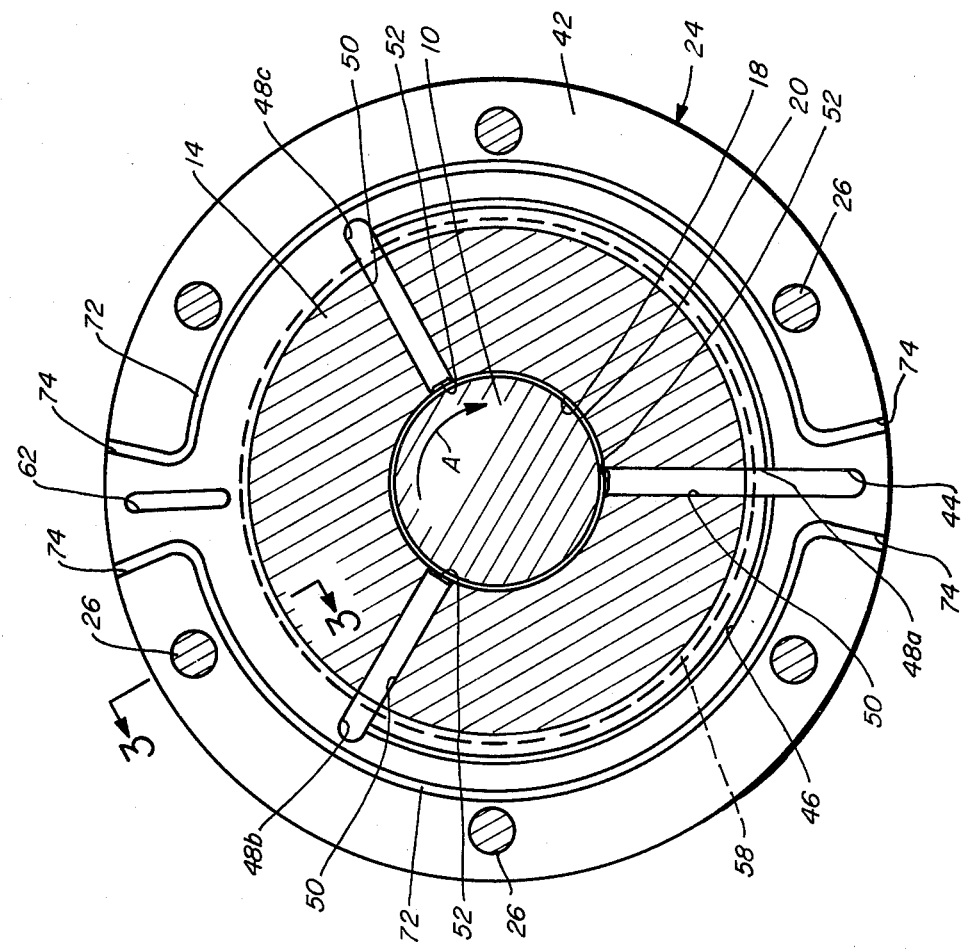
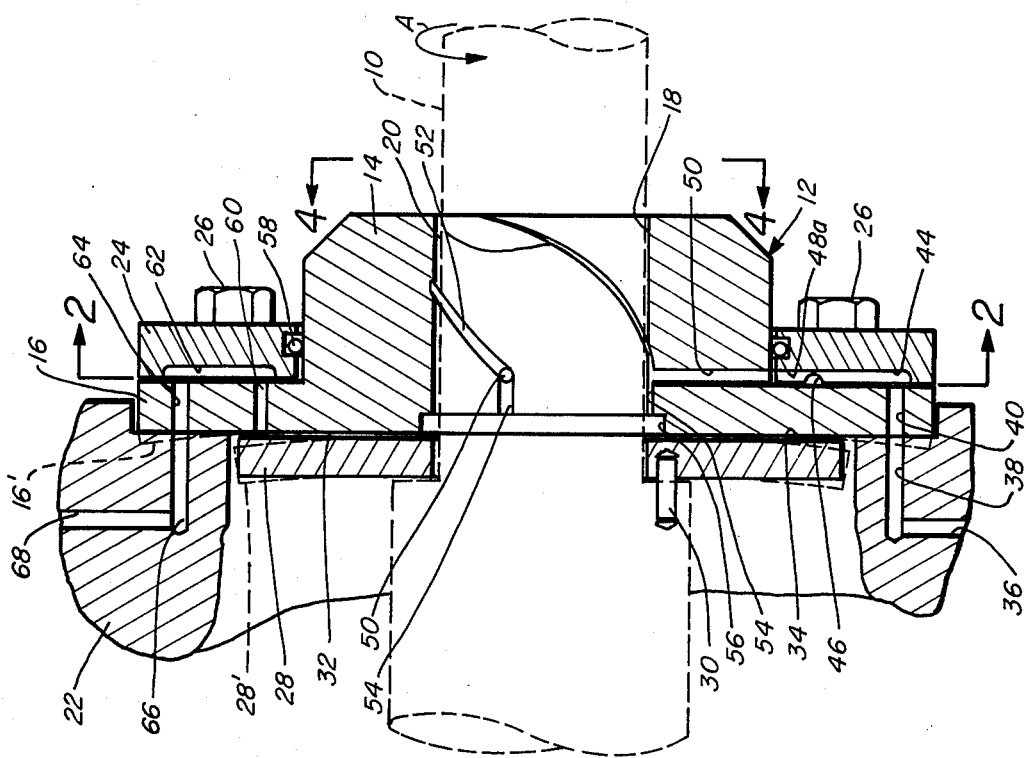
FIG. 2
FIG. 1

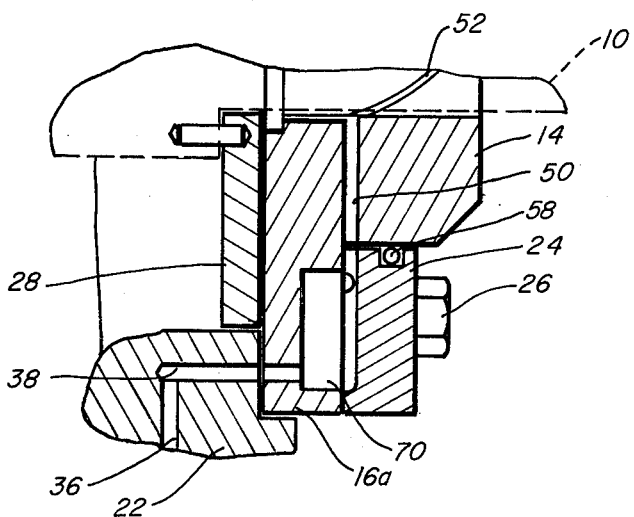
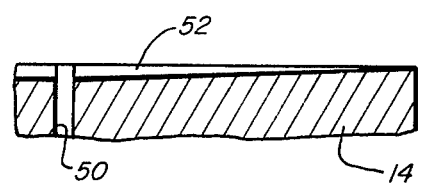
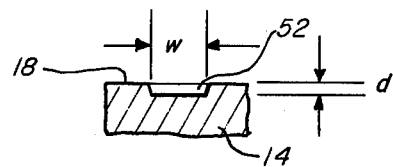
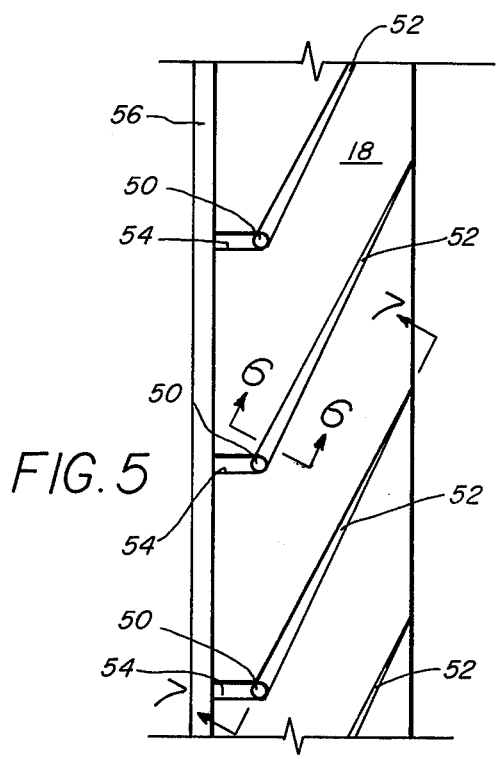
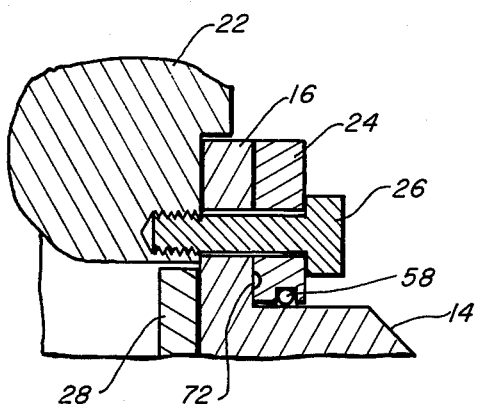
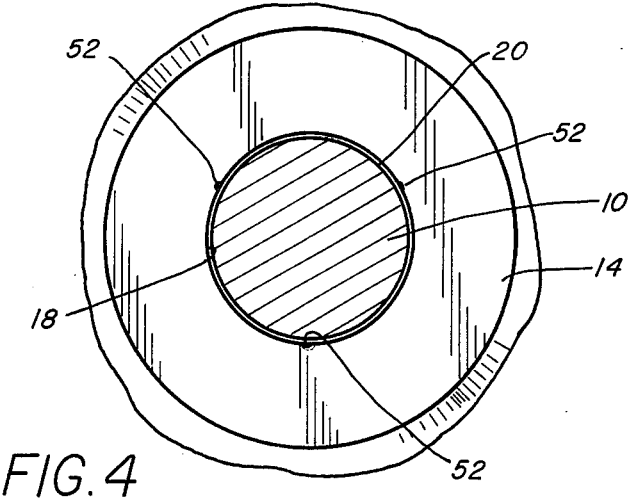

BEARING ASSEMBLY

BACKGROUND OF THE INVENTION

1. Field of the Invention

The present invention pertains to journal bearing assemblies and particularly to high speed bearings. Such a bearing typically supports a relatively rigid shaft, i.e. one with a substantial diameter. Therefore the rubbing speed of the shaft as it rotates is high. To properly support the shaft precluding significant bending thereof, a thin film of a viscous lubricant must be provided between the bearing surfaces.

As the shaft rotates, the friction associated with the shearing of the lubricant film generates high quantities of heat which cause thermal expansion of the shaft and bearing. The expansion of these two parts often disturbs the optimum thickness of the lubricant film which results in further generation of heat. A self-damaging cycle is thus initiated and can ruin the bearing.

The problem may be further complicated if the expansion of the bearing member is not uniform along its length. For example, the journal bearing member may have an annular flange extending radially outwardly, usually adjacent one end of the journal portion. This flange may be used to mount the bearing, and at least a portion of the flange may serve as one component of a thrust bearing. However, the outer area of the flange is so far removed from the site of the heat generation, i.e. the bearing surfaces, that it will be relatively cold in use. Thus the part of the journal portion of the bearing surrounded by the flange may be forced to expand radially inwardly when heated while the part of the journal portion at the other end of the bearing may expand radially outwardly. This destroys the uniformity of thickness of the lubricant film and may result in severe damage to the bearing assembly.

2. Description of the Prior Art

The problems described above have conventionally been solved by increasing the clearance between the shaft and the journal bearing member so that a significant amount of inward expansion of the journal bearing member can be tolerated without serious damage to the bearing assembly. However, this precludes the use of a lubricant film of relatively uniform and optimum thickness so that the rigidity with which the shaft is supported, the load carrying capacity of the assembly, and the general efficiency are all reduced.

The conventional approach also involves attempts to control the temperature of the bearing by forcibly pumping large quantities of lubricant through the bearing. This, of course, is expensive. Another conventional expedient is to provide a relatively deep circumferential lubricant supply groove in the inner diameter of the journal bearing member. However, such a groove tends to allow lubricant to drain from the loaded side of the bearing thereby decreasing the requirement for high pressure pumping of the lubricant through the bearing.

SUMMARY OF THE INVENTION

The present invention provides a bearing assembly having a journal bearing member including a journal portion for receipt of a shaft and an annular flange portion extending radially outwardly therefrom to support or mount the journal portion. The effective radial rigidity of the flange portion is less than the radial rigidity of the journal portion. Thus, when the journal portion is heated in operation, it will be free to expand radially outwardly along its entire length and will not be crushed inwardly in the area surrounded by the flange portion.

In preferred embodiments of the invention the effective radial rigidity of the flange portion is made less than that of the journal portion of the journal bearing member by making the flange portion of substantially smaller average longitudinal cross-sectional area than the journal portion. This may be done in several ways, for example by making the flange portion with a substantially uniform, relatively small axial thickness with respect to its radial width, or by providing in the flange portion a plurality of circumferentially spaced apart areas of reduced axial thickness. Yet the axial strength of the flange portion remains high enough to allow the flange portion to properly support or mount the journal bearing member and/or to partially comprise a thrust bearing. The axial strength of the flange portion is enhanced by the use of a complementary annular thrust bearing member on the shaft and by a support ring.

The above features tend to reduce the problems associated with the heating of journal bearing assemblies while still maintaining a high load carrying capacity and rigid support of the shaft. The efficiency of the assembly is further increased by an improved system of passageways for delivering lubricant to the bearing surfaces. The configuration and orientation of these passageways helps to assure that a sufficient quantity of lubricant is distributed properly and uniformly, while preventing undesirable flow patterns, and thereby less energy is utilized in forcibly pumping the lubricant through the bearing.

In the preferred embodiments, the passageways include shallow helical channels in one of the rotary bearing surfaces, the transverse cross-sectional areas of the channels decreasing from their intake ends. These channels enhance the hydrodynamic carrying ability of the bearing and the rigidity of shaft support.

Accordingly it is a principal object of the present invention to provide an improved journal bearing assembly.

Another object of the invention is to provide a journal bearing member having a radially outwardly extending flange of less effective radial rigidity than the journal portion of the member.

Still another object of the present invention is to provide an improved combination journal and thrust bearing.

A further object of the present invention is to provide an improved lubricant delivery system for a bearing assembly.

Yet another object of the present invention is to provide an improved journal bearing for rigidly supporting a shaft without significant bending of the latter.

Still a further object of the invention is to provide a journal bearing including a support ring for a radially flexible mounting flange.

One more object of the invention is to provide an improved lubricant delivery system for a journal bearing which improves the hydrodynamic carrying ability of the bearing and rigidity of support of the shaft.

Still other objects, features, and advantages of the present invention will be made apparent by the following description of the preferred embodiments, the drawings, and the claims.

BRIEF DESCRIPTION OF THE DRAWINGS

FIG. 1 is a longitudinal sectional view of a bearing assembly in accord with the pesent invention.

FIG. 2 is a transverse cross-sectional view taken along lines 2—2 of FIG. 1.

FIG. 3 is a fragmentary sectional view taken along lines 3—3 of FIG. 2.

FIG. 4 is a fragmentary transverse sectional view taken along lines 4—4 of FIG. 1.

FIG. 5 is a developed view of the inner surface of the journal bearing member.

FIG. 6 is an enlarged fragmentary sectional view taken along lines 6—6 of FIG. 5.

FIG. 7 is an enlarged fragmentary sectional view taken along lines 7—7 of FIG. 5.

FIG. 8 is a fragmentary longitudinal sectional view of a modified form of the invention.

DESCRIPTION OF THE PREFERRED EMBODIMENTS

Referring now to the drawings, FIG. 1 shows a bearing assembly according to a preferred embodiment of the invention. The bearing assembly comprises a shaft member 10. The assembly also includes a journal bearing member 12 having a generally cylindrical journal portion 14 and an annular flange portion 16 extending radially outwardly from the journal portion 14 adjacent one axial end thereof. Journal portion 14 receives the shaft 10 for relative rotation between the two. As shown, shaft 10 is the rotating member and supports a rotor (not shown), although the invention is also applicable to devices in which a surrounding member rotates about a stationary shaft. Thus the term "journal portion" will, for convenience, be applied herein to the portion of the bearing member which recieves the shaft and is simply intended to distinguish the radial portion of the bearing member from the thrust portion and not to imply which of the two members is rotating and which is stationary. The journal portion 14 and shaft 10 have opposed generally cylindrical rotary bearing surfaces 18 and 20, respectively.

Flange 16 is used to support or mount the journal bearing member 12 on a machine body 22. In particular, the body 22 is disposed adjacent the axially outer side of flange portion 16. A support ring 24 is disposed adjacent the axial inner side of flange portion 16. Flange portion 16 is clamped between the machine body 22 and the support ring 24 by bolts 26 (see FIGS. 1, 2 and 3).

Shaft 10 has an annular thrust bearing member 28 secured thereto by pins such as 30 and extending radially outwardly therefrom. Thrust bearing member 28 is disposed adjacent the axial end of the journal bearing member 12 at which the flange portion 16 is located, the members 12 and 28 have opposed annular thrust bearing surfaces 32 and 34, respectively, the surface 32 being defined partially by the end face of the journal portion 14 and partially by the radially inner part of flange portion 16.

The bearing assembly has a system of lubrication passageways therein for supplying lubricant to rotary bearing surfaces 18 and 20 as well as to thrust bearing surfaces 32 and 34. These include supply passageways 36 and 38 in the machine body 22. Passageway 36 leads radially into the machine body, and passageway 38 extends longitudinally from passageway 36 out through the machine body to the flange portion 16. Flange portion 16 has a supply passageway 40 extending longitudinally therethrough in communication with passageway 38.

The end face 42 of support ring 24 which opposes the flange portion 16 has a plurality of supply grooves therein which, in cooperation with the opposing face of flange portion 16, form lubricant passageways. These include a radial inlet groove 44 having an outer end located inwardly of the radially outer extremity of face 42 and extending radially inwardly to an arcuate circumferentially extending groove 46 extending partially around the end face 42 slightly outwardly of the radially inner extremity thereof. Three radial outlet grooves 48a, 48b and 48c are connected by the circumferentially extending groove 46 and extend radially inwardly therefrom through the inner edge of ring 24. Grooves 48a, 48b and 48c are symmetrically circumferentially spaced about ring 24 and groove 48a is actually an extension of radial inlet groove 44. An elastomeric O-ring seal 58 is disposed in a groove in the radially inner surface of ring 24 to seal between ring 24 and journal bearing member 12. It can be seen that, alternatively, the grooves might be provided in the flange 16 rather than in the ring 24.

Journal portion 14 of the journal bearing member 12 has three ports 50 extending radially therethrough. The ports 50 are located just axially inwardly of the flange portion 16 (i.e. relatively closer to thrust bearing surface 32 than to the other end of member 12) and each registers with a respective one of the grooves 48a, 48b and 48c. The rotary bearing surface 18 of the journal portion 14 has a plurality of channels formed therein (best seen by comparison of FIGS. 1, 2, 4 and 5). In particular, there are three first channels 52 each communicating with a respective one of the ports 50. Each channel 52 extends axially and circumferentially from its respective port 50, in a helical path, the direction of axial extent being away from the flange portion 16. As best seen in FIG. 5 there is a slight overlapping of adjacent ones of the channels 52. As shown in FIG. 6, the depth $d$ of the channel 52 has been exaggerated with respect to its width $w$. In preferred embodiments, the channels 52 are quite shallow, the ratio $d/w$ at the deep or intake end of the channel adjacent ports 50 preferably being on the order of 1/50. It can also be seen, by referring to FIGS. 5 and 7 that both the width and the depth of the channels 52 are tapered, decreasing from the intake ends adjacent ports 50. Thus the transverse cross-sectional area of the channels decrease from their intake ends. Three second channels 54 each communicate with a respective one of the ports 50 and extend axially therefrom toward the thrust bearing member 28. Thrust bearing surface 32 has an annular recess 56 at its inner edge to serve as a lubricant gallery and reservoir, and each of the channels 54 leads to this recess. Conventional whipple grooves may extend from the recess 56 across the thrust bearing surface 32. Channels 52 and 54 are sized to deliver the proper proportion of lubricant to the rotary bearing surfaces 18 and 20 and the thrust bearing surfaces 32 and 34, respectively.

In operation, the shaft 10 rotates in the direction of the Arrow A in FIGS. 1 and 2. The helixes of the channels 52 are wound in the direction, with respect to the rotation of shaft 10, such that this rotation will tend to sweep the lubricant along the channels 52 away from the ports 50. This increases the amount of lubricant flowing into the bearing with increasing speed. The helical configuration of channels 52 also distributes the lubricant both axially and circumferentially over the bearing surfaces 18 and 20 even though the lubricant is introduced through only three small ports 50. Finally, the helical configuration allows the channels 52 to be made relatively long. This length, together with the relatively great width to depth ratio of the channels, makes for a relatively large pressure drop along the channels 52. In effect, the channels 52 themselves serve as restrictions controlling the flow. Thus the lubricant is caused to flow in the desired patterns without high pressure pumping. The preferred width to depth ratio of the channels 52 also means that nearly half of the cross-sectional area of the flowway formed by the opposed channel and shaft is defined by the shaft. This allows maximum use of the velocity of the shaft to sweep the lubricant along the channels as described above, and this velocity further increases the flow velocity. In preferred embodiments of the invention, most of the pressure gradient of the lubricant as it flows through the bearing is over the channels 52.

The rigidity of support of the shaft 10 is inversely related to the ability of lubricant to be squeezed out from between surfaces 18 and 20 on the loaded side of the bearing. The high pressure drop along the channels 52 resists squeezing of the lubricant into these channels, i.e. reverse flow. This substantially prevents deterioration of the rigidity with which shaft 10 is supported and thus increases the load carrying capacity of the bearing assembly. Furthermore, if any lubricant is squeezed back into channels 52 from between the bearing surfaces 18 and 20, it will only serve to increase the pressure drop and thus resist further such drainage.

The area of a journal bearing on the loaded side, usually at the underside of the shaft, has a pressure zone in the lubricant in that area. This pressure zone results from several interacting factors, i.e. the lubricant being squeezed out of the zone by the loading of the bearing, the lubricant being dragged into the zone by the rotation of the shaft, and the lubricant being dragged out of the zone by the rotating shaft. The lubricant film in this zone will naturally be thinner where it is being dragged out than where it is being dragged in so that there is a net inflow of lubricant into the zone. The tapered width and depth of the channels 52 increase this net inflow by enhancing the natural difference in lubricant film thickness. Thus the channels 52 tend to spill lubricant into the pressure zone.

It can thus be seen that the shallow channels 52 allow relatively large quantities of lubricant to flow through the journal bearing without sacrificing the advantages of a thin lubricant film. Thus the rigidity with which the shaft is supported is enhanced. This effect is further heightened by the tapering of the channels which improves the hydrodynamic carrying ability of the bearing and the non-bending rigid support of the shaft.

Channels 54 leading to the thrust bearing surfaces 32 and 34 are short, and the fluid flow velocity therein is relatively high and originates from pressure sources so that channels 54 do not represent a route of substantial drainage from the rotary bearing surfaces 18 and 20.

The channels 54 deliver lubricant to the reservoir formed by recess 56 and also to the small portions of the rotary bearing surfaces 18 and 20 which are not supplied by the channels 52. From recess 56, the lubricant flows radially outwardly over the thrust bearing surfaces 32 and 34. The lubricant may be drained off from the interior of the machine body 22 in any suitable manner and recycled through the bearing.

As the machine operates, the journal portion 14 of the journal bearing member 12 and the shaft 10 will become relatively hot and will tend to expand. Even though the flange portion 16, being remote from the area of frictional heat generation, will be relatively cool, it has relatively low effective radial rigidity, i.e. high radial elasticity, with respect to journal portion 14. Thus it will permit the journal portion 14 to expand radially outwardly even in the area adjacent the flange portion 16 so that a uniform and proper thickness of the lubricant film between surfaces 18 and 20 may be maintained. In particular, the longitudinal cross-sectional area of flange portion 16 is relatively small compared to that of journal portion 14, as can be seen in FIG. 1. Journal portion 14 is more than three times larger in the preferred embodiment shown, although the optimum ratio will vary depending on the construction materials, dimensions and operating conditions of specific bearing assemblies. Thus the flange portion 16 is relatively flexible radially. Furthermore, the flange portion 16 is formed of such material, e.g. brass, that it will be resilient, i.e. will return to its initial position after radial flexing. Thus, when the journal portion 14 begins to tend to expand outwardly, the flange portion 16 will flex radially to permit such expansion. Thus close tolerances may be used between surfaces 18 and 20, and this makes for a journal bearing of maximum load carrying capacity and one which rigidly supports the shaft 10.

An important feature of the present invention is that, even though the flange portion 16 is radially flexible, its axial strength and ability to properly serve as a thust bearing component is not destroyed. In particular, when the flange portion 16 flexes radially, its end face may assume a slightly frusto-conical configuration. However, the heated thrust bearing member 28 in operation will tend to "dish" so that its opposed surface 34 will tend to assume a generally complementary frusto-conical configuration. These complementary deformations are shown (greatly exaggerated) in phantom at 28' and 16' in FIG. 1. Thus the thickness of the oil film between thrust bearing surfaces 32 and 34 will remain generally uniform, and the flexibility of the flange portion 16 will actually enhance the thrust support capability of the film between the surfaces 32 and 34. The axial strength of flange portion 16 is further protected by its being clamped between support ring 24 and body 22. Ring 24 and body 22 are preferably formed of a relatively hard material such as steel.

The bearing assembly described above lends itself readily to the incorporation of a system of tap flowways by means of which the pressure of the lubricant between the bearing surfaces may be tested or monitored. As best shown in FIG. 1, tap bore 60 extends axially through the flange portion 16. Bore 60 communicates at one end with the area between the thrust bearing surfaces 32 and 34 and at the other end with the radially inner portion of a radially extending tap groove 62 in the adjacent end face of ring 24. Groove 62 is located generally diametrically opposite radial inlet groove 44 and is isolated from the lubricant supply grooves 44, 46, 48a, 48b, and 48c. The tap groove 62 does not extend all the way across the end face of ring 24; rather its inner end is located outwardly of the radially inner extremity of the ring, and its outer end is located inwardly of the radially outer extremity of the ring. A drain bore 64, parallel to tap bore 60 extends axially through the flange portion 16 from the outer portion of tap groove 62 to the machine body 22. A system of interconnecting flowways 66, 68 in body 22 communicate with bore 64 and extend to a manometer or the like (not shown).

As shown, the support ring 24 is clamped against the flange portion 16 tightly enough that a metal-to-metal seal is formed near the radially outer extremities of the two. With such a seal, some lubricant leakage will usually occur. Although such leakage will not ordinarily interfere with proper lubrication of the bearing, it may upset other functions of the machine as by affecting the pressure in the tap groove 62. Thus where the seal is metal-to-metal, it is preferable to provide a system of drain grooves in critical areas in the face of ring 24 which abuts the flange portion 16 to drain leaking lubricant away from the interface. Two such arcuate drain grooves 72 are provided. Each groove 72 is located radially outwardly of the groove 46 and each has one end spaced slightly from a respective side of the tap groove 62 and extends slightly less than half-way around the face of ring 24 to a point spaced slightly from a respective side of inlet groove 44. Adjoining each end of each of the grooves 72 is a groove 74 which extends radially outwardly through the edge of ring 24. In other embodiments, a seal other than the metal-to-metal type, e.g. a suitable gasket, might be employed, in which case the grooves 72 and 74 might be omitted.

FIG. 7 shows a modified form of the invention in which an alternative means of providing the desired radial flexibility of the flange portion 16a of the journal bearing member is used. As shown, the flange portion 16a is, in general, not as thin axially with respect to its radial width as is the flange portion 16 of the first embodiment. However, flange portion 16a has formed in its axially inner end face a plurality of circumferentially spaced apart areas of reduced axial thickness, one of which is shown at 70. At the areas such as 70, the flange portion 16a is even thinner than the flange portion 16 of the first embodiment. The average thickness, and thus the average longitudinal cross-sectional area, of the flange portion 16a is therefore small enough to provide the desired radial flexibility.

Numerous modifications of the preferred embodiments of the present invention described above may be made without departing from the spirit of the invention. It is therefore intended that the scope of the invention be limited only by the claims which follow.

I claim:
1. A bearing assembly comprising:
a shaft member;
a journal bearing member having an annular journal portion receiving said shaft member for relative rotation between said two members, said journal portion and said shaft member having opposed generally cylindrical rotary bearing surfaces, and an annular flange portion extending radially outwardly from said journal portion, the effective radial rigidity of said flange portion being less than the radial rigidity of said journal portion.

2. The bearing assembly of claim 1 wherein said flange portion is radially flexible and resilient.

3. The bearing assembly of claim 1 wherein the effective radial rigidity of said flange portion is a function of the average longitudinal cross-sectional area of said flange portion.

4. The bearing assembly of claim 1 wherein said flange portion has a substantially uniform, relatively small axial thickness with respect to its radial width.

5. The bearing assembly of claim 1 wherein said flange portion has a plurality of circumferentially spaced apart areas of reduced axial thickness.

6. The bearing assembly of claim 1 wherein one of said members has a plurality of spaced apart, radially extending ports therein for delivering lubricant to the area between said rotary bearing surfaces.

7. The bearing assembly of claim 6 wherein said one member further has a respective first channel in its rotary bearing surface communicating with each of said ports for distributing lubricant about the area between said rotary bearing surfaces.

8. The bearing assembly of claim 7 wherein said one member is said journal bearing member.

9. The bearing assembly of claim 8 wherein each of said first channels extends circumferentially and axially away from its respective port in a helical path.

10. The bearing assembly of claim 9 wherein said shaft member rotates with respect to said journal bearing member in a direction to sweep lubricant away from said portions along said first channels.

11. The bearing assembly of claim 10 wherein the transverse cross-sectional areas of said first channels decrease from adjacent said ports along the lengths of said channels.

12. The bearing assembly of claim 11 wherein the widths of said channels decrease from adjacent said ports along the lengths of said channels.

13. The bearing assembly of claim 12 wherein the depths of said channels decrease from adjacent said ports along the lengths of said channels.

14. The bearing assembly of claim 8 wherein the width of each of said first channels is substantially greater than its depth.

15. The bearing assembly of claim 8 further comprising a machine body adjacent one axial side of said flange portion; a support ring adjacent the other axial side of said flange portion and said support ring and said flange portion having opposed annular end faces, one of said end faces having supply groove means therein in communication with said ports for delivering lubricant to said ports; and clamping means for clamping said flange portion between said machine body and said support ring.

16. The bearing assembly of claim 15 wherein said one end face is the end face of said support ring, and wherein said groove means include a plurality of circumferentially spaced radial outlet grooves each extending from a point intermediate the radially inner and outer extremities of said end face to the radially inner extremity of said end face to communicate with a respective one of said ports, a circumferentially extending groove interconnecting said radial outlet grooves, and a radial inlet groove extending radially outwardly from said circumferentially extending groove.

17. The bearing assembly of claim 16 wherein said inlet groove has an outer end located inwardly of the radially outer extremity of said end face, and wherein said flange portion and said machine body have a system of interconnecting supply passageways communicating with said outer end of said inlet groove.

18. The bearing assembly of claim 17 further comprising seal means substantially surrounding said groove means.

19. The bearing assembly of claim 18 wherein said seal means comprises drainage groove means in said end face.

20. The bearing assembly of claim 15 wherein said flange portion is located at one axial end of said journal portion, wherein said support ring is disposed on the axially inner side of said flange portion, and said assembly further comprising an annular thrust bearing member extending radially outwardly from said shaft member and located adjacent said one axial end of said journal portion, said journal bearing member and said thrust bearing member having opposed axially directed thrust bearing surfaces.

21. The bearing assembly of claim 20 wherein the thrust bearing surface of said journal bearing member is defined partially by said journal portion and partially by said flange portion.

22. The bearing assembly of claim 21 wherein said ports are located intermediate the axial extremities of said journal bearing member, wherein each of said first channels extends from the respective port axially away from said thrust bearing member, and wherein said journal bearing member further has a respective second channel in its rotary bearing surface communicating with each of said ports and extending from said port toward said thrust bearing member to deliver lubricant to the area between said thrust bearing surfaces.

23. The bearing assembly of claim 22 wherein said ports are located closer to said one axial end of said journal portion than to the other.

24. The bearing assembly of claim 22 wherein said flange portion and said support ring have a system of interconnecting pressure tap flowways therein communicating with the area between said thrust surfaces.

25. The bearing assembly of claim 24 wherein said pressure tap flowways include a tap bore extending axially through said flange portion; a radially extending tap groove in said end face of said support ring isolated from said groove means, said tap groove having an inner end spaced outwardly from the radially inner extremity of said end face and communicating with said tap bore and an outer end spaced inwardly from the radially outer extremity of said end face; and a drain bore communicating with said outer end of said tap groove and extending axially through said flange portion.

* * * * *

UNITED STATES PATENT AND TRADEMARK OFFICE
CERTIFICATE OF CORRECTION

PATENT NO. : 4082379
DATED : April 4, 1978
INVENTOR(S) : Judson S. Swearingen

It is certified that error appears in the above-identified patent and that said Letters Patent are hereby corrected as shown below:

In Column 3, line 47, delete the word "axial" and insert therefor --axially--.

In Column 4, line 39, delete the number "6" and insert therefor --7--.

Signed and Sealed this

Twentieth Day of February 1979

[SEAL]

Attest:

RUTH C. MASON
Attesting Officer

DONALD W. BANNER
Commissioner of Patents and Trademarks